United States Patent
Woodell (10) Patent No.: US 6,549,161 B1
(45) Date of Patent: Apr. 15, 2003

(54) MULTIPLE ALTITUDE RADAR SYSTEM (75) Inventor: Daniel L. Woodell, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/886,932

(22) Filed: Jun. 21, 2001

(51) Int. Cl.$^7$ ............................................. G01S 13/95
(52) U.S. Cl. ...................................................... 342/26
(58) Field of Search ........................................... 342/26

(56) References Cited

U.S. PATENT DOCUMENTS

| | | | | |
|---|---|---|---|---|
| 5,198,819 A | * | 3/1993 | Susnjara | 342/26 |
| 5,311,183 A | * | 5/1994 | Mathews | 342/26 |
| 5,828,332 A | * | 10/1998 | Frederick | 342/26 |
| 5,907,568 A | * | 5/1999 | Reitan, Jr. | 342/26 |
| 6,138,060 A | | 10/2000 | Conner et al. | 701/9 |
| 6,201,494 B1 | * | 3/2002 | Kronfeld | 342/26 |
| 6,236,351 B1 | * | 5/2002 | Conner et al. | 342/26 |

FOREIGN PATENT DOCUMENTS

WO    WO 9822834 A    *    9/1999

* cited by examiner

Primary Examiner—John B. Sotomayor
(74) Attorney, Agent, or Firm—Nathan O. Jensen; Kyle Eppele (57) ABSTRACT

A multiple altitude radar system for an aircraft performs a main radar sweep at an altitude of the aircraft and at least one secondary radar sweep at an angle from the altitude of the aircraft to a ground altitude.

19 Claims, 7 Drawing Sheets

MULTIPLE ALTITUDE RADAR SYSTEM

BACKGROUND OF THE INVENTION

The present invention relates to aircraft radar systems, and more particularly to a multiple altitude radar system having the capability to operate both in front of an aircraft and at an angle below the aircraft for improved detection of weather patterns and associated turbulence.

Modern aircraft are equipped with many on-board safety and diagnostic systems, including a radar system for detecting weather patterns located generally in front of the aircraft. The first aircraft radar systems utilized parabolic antennas which had a radiation pattern including substantial side lobes, or areas outside the main antenna focusing region in which lesser intensities of radiation are emitted. At cruising altitudes, the side lobes of these radar systems would detect weather patterns located below the flight path altitude of the aircraft. Situations would occasionally occur in which the main beam of the radar system would not detect a region of weather having a high enough reflectivity to be displayed on the instrument display, but the side lobe of the radar system would detect a region of high reflectivity below the flight path of the aircraft and would thus generate a display on the instrument panel. These situations most often occurred when the cruising altitude of the aircraft was substantially above the freezing altitude. Pilots learned to use this type of information provided by the radar system to their advantage, relying on the lower side lobe of the radar system to detect regions of weather below the freezing altitude. If the pilot saw a cloud top and the radar system indicated detection of a weather pattern, the pilot knew that the weather pattern was located below the altitude of the aircraft flight path.

Parabolic antennas have been gradually replaced in nearly all modern aircraft radar systems by flat plate phased array antennas in an effort to reduce the cost and improve the performance of the radar systems. The flat plate phased array antenna has reduced side lobe radiation levels, which is desirable to reduce spurious radar detections outside of the main antenna lobe. However, this also results in the loss of the ability to detect weather patterns whose major regions of high radar reflectivity are located below the flight path of the aircraft. One attempted solution to this problem has been to increase the gain of the radar system, so that areas of moderate or relatively low radar reflectivity (e.g., the frozen top portion of a storm) would be detected and displayed on the instrument panel. This solution has not been entirely effective, since the radar reflectivity of the top portion of a storm is often so low that radar detection is impossible, and since storms may not even exist at the altitude of the aircraft flight path until the aircraft passes above the storm, while the storm may grow up to the level of the aircraft to intersect the flight path.

What is needed is a radar system that enables detection of weather patterns located below the altitude of an aircraft.

What is also needed is a radar system that detects developing weather patterns that are predicted to grow into the flight path of an aircraft.

BRIEF SUMMARY OF THE INVENTION

The present invention is a multiple altitude radar system for an aircraft. The radar system performs a main radar sweep at an altitude of the aircraft and at least one secondary radar sweep at an angle from the altitude of the aircraft to a ground altitude. These multiple radar sweeps provide data that can then be analyzed and manipulated to determine weather locations in three dimensions. In some embodiments, more complex and complete weather information such as turbulence, storm growth rates, and the like may also be determined.

DETAILED DESCRIPTION

Figure 1:
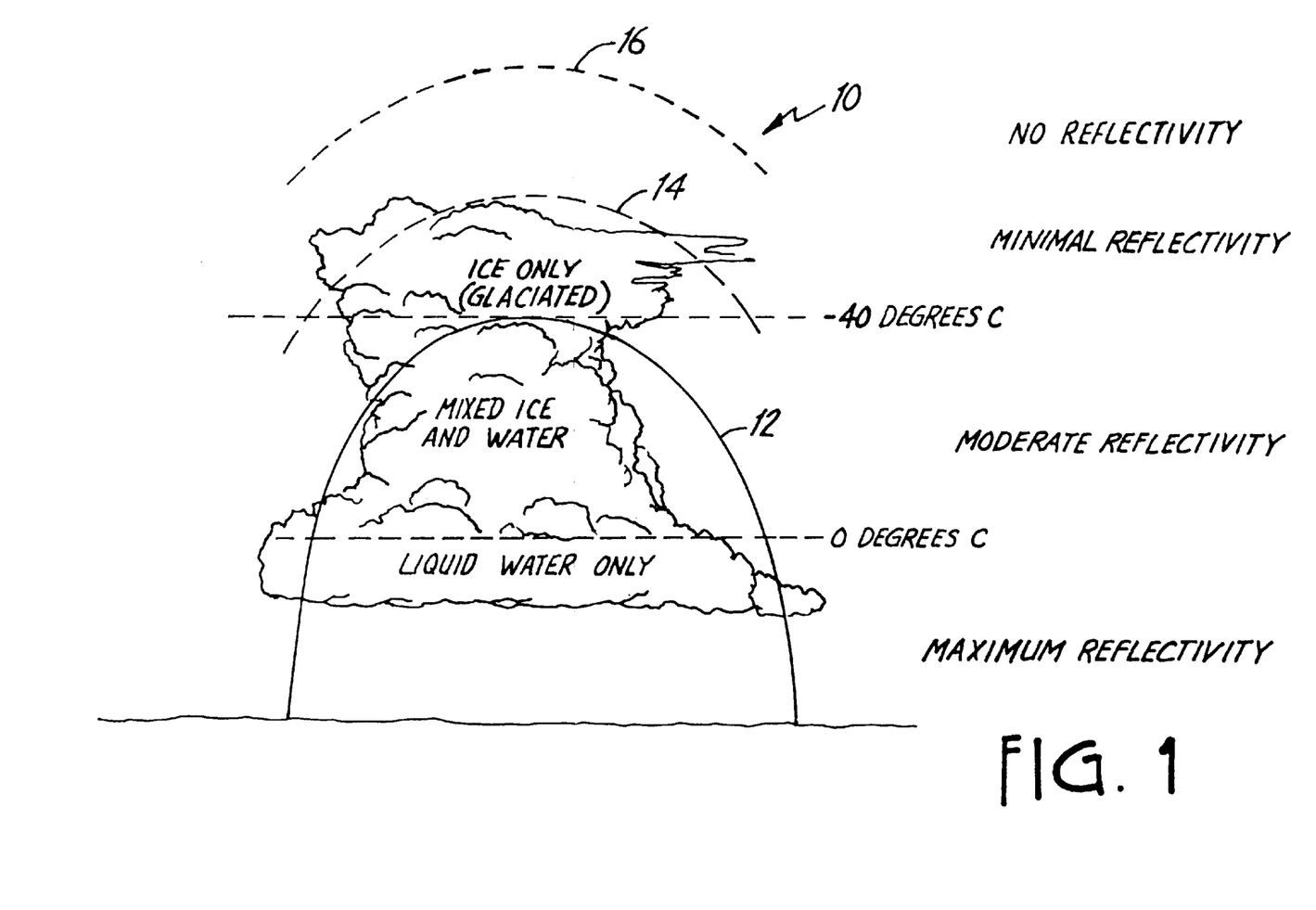
FIG. 1 is a diagram illustrating the geometric distribution of a typical thunderstorm.

FIG. 1 is a diagram illustrating the geometric distribution of typical thunderstorm 10. The portion of thunderstorm 10 at the lowest altitude (closest to the ground) contains liquid water only. This portion has a high level of radar reflectivity. Above a freezing level, thunderstorm 10 includes a mixture of ice and water, with moderate radar reflectivity, and a portion of thunderstorm 10 above a temperature level of about −40° C. contains ice only, with relatively low radar reflectivity. Above the ice portion of thunderstorm 10, there is a region with little or no radar reflectivity, where turbulence may exist due to a building thunderstorm.

Based on the geometry of thunderstorm 10, regions may be defined by their ability to be detected by radar, their visibility, and their effect on an aircraft. Region 12, which includes the liquid water and the mixed ice and water portions of thunderstorm 10, is a region that is detectable by an aircraft radar system, due to the high and moderate radar reflectivity of those portions of thunderstorm 10. Region 14 (above region 12), which includes the ice portion of thunderstorm 10, is a region that is visible to a pilot but is not normally detectable by radar, due to the low radar reflectivity of the ice portion of thunderstorm 10. Region 16 (above region 14) is not visible or detectable by radar, but is a region of possible high turbulence which could affect the stability of an aircraft passing through.

The present invention employs a multiple altitude radar system to protect an aircraft from inadvertent encounters with weather patterns at or below the aircraft's current flight path. Weather patterns may be located below the aircraft and rising into the flight path of the aircraft, or weather patterns that could influence the aircraft (such as by high turbulence) may be detectable only at an altitude below the current altitude of the aircraft. The multiple altitude radar system of the present invention has a number of permutations in both sensing the weather patterns at different altitudes and displaying the detected weather patterns with varying degrees of altitude information. For example, sensing weather patterns at an altitude below a main radar sweep may be achieved by adding an antenna sweep below the main radar sweep, using two or more radar antennas to perform radar sweeps at different altitudes, sweeping the radar antenna vertically through a detected weather pattern, or employing an electronic scanning system capable of modifying the pointing angle and pattern of the antenna at a high rate of speed. Weather patterns may be displayed by simply showing weather patterns in standard weather encoded colors, using density modulation or other identifying display characteristics to represent the relative altitude of weather, producing icons to represent the altitude and vertical growth of weather patterns, labeling estimated altitude clearances for weather patterns, labeling estimated altitudes and vertical growth of weather patterns, or producing a three dimensional view of the weather patterns. Exemplary embodiments are described herein for purposes of illustration only and should not be considered as limiting the scope of the invention.

Figure 2:
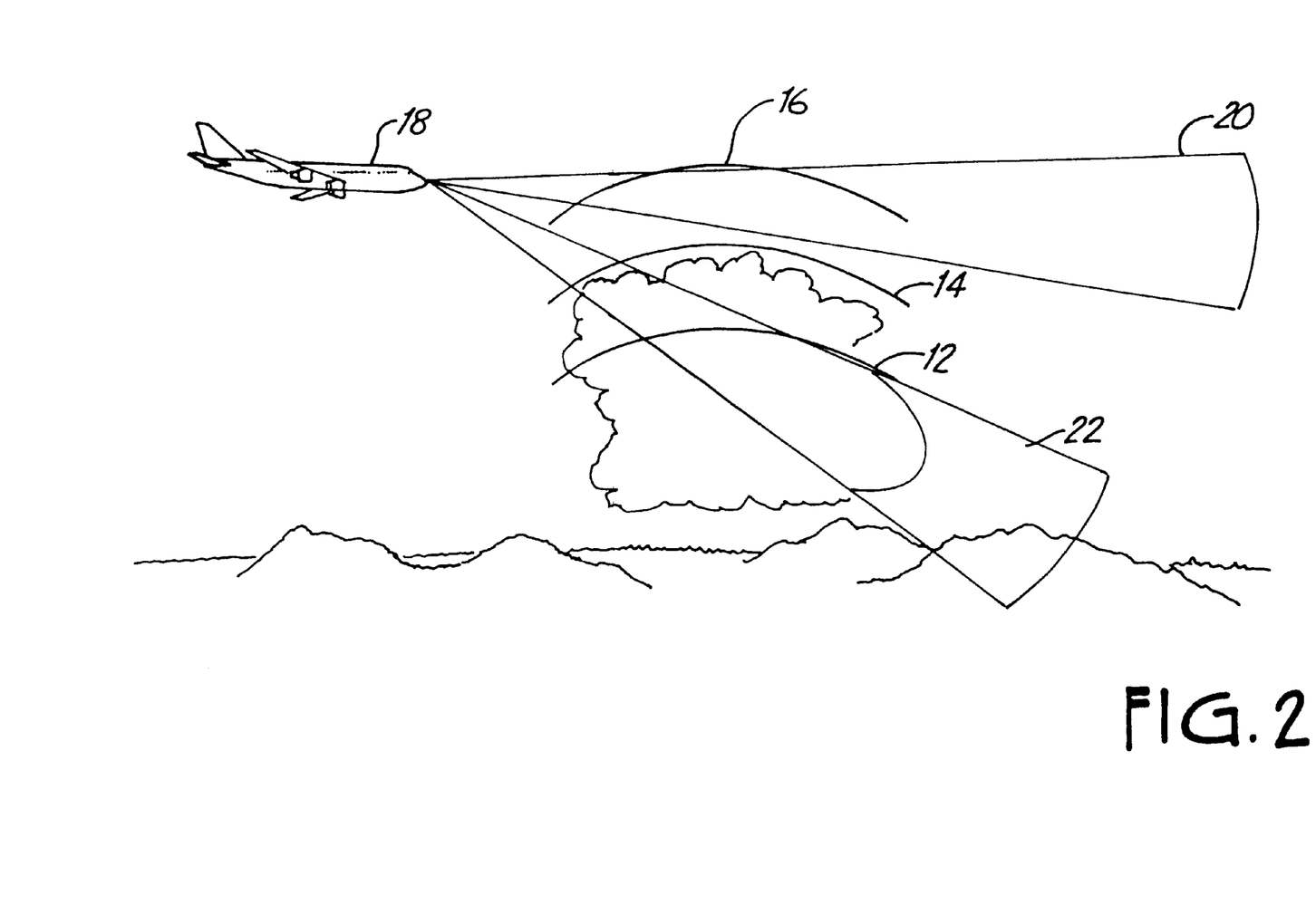
FIG. 2 is a diagram illustrating a multiple altitude radar system associated with an aircraft according to a first exemplary embodiment of the present invention.

FIG. 2 is a diagram illustrating a multiple altitude radar system associated with aircraft 18 according to a first exemplary embodiment of the present invention. The radar system performs main radar sweep 20 in front of aircraft 18 at the same general altitude as aircraft 18. Main radar sweep 20 detects any weather patterns existing at the altitude of aircraft 18 in its general flight path direction. Secondary radar sweep 22 is performed by the radar system at an angle from aircraft 18 toward the ground. Secondary radar sweep 22 detects any weather patterns existing at an altitude below the altitude of aircraft 18 in its general flight path direction. For the exemplary weather configuration shown in FIG. 2, secondary radar sweep 22 detects the presence of a weather pattern that would cause turbulence for aircraft 18 if the flight path of aircraft 18 were not changed to avoid the weather pattern. Main radar sweep 20 does not detect the weather pattern, since turbulence region 16 has little radar reflectivity, visible region 14 is not within the field of view of a pilot in aircraft 18, and high/moderate radar reflectivity region 12 is not reached by main radar sweep 20.

In an exemplary embodiment of the present invention, the data provided by secondary radar sweep 22 is digitally truncated to eliminate ground clutter that would otherwise be displayed on the radar instrumentation viewed by the pilot. The range at which digital truncation should occur may be derived from the known altitude of aircraft 18 and the known angle of secondary radar sweep 22 from aircraft 18 to the ground. In addition, the gain associated with the data provided by main radar sweep 20 and secondary radar sweep 22 may be independently controlled so that the effectiveness of each beam may be maximized.

Figure 3:
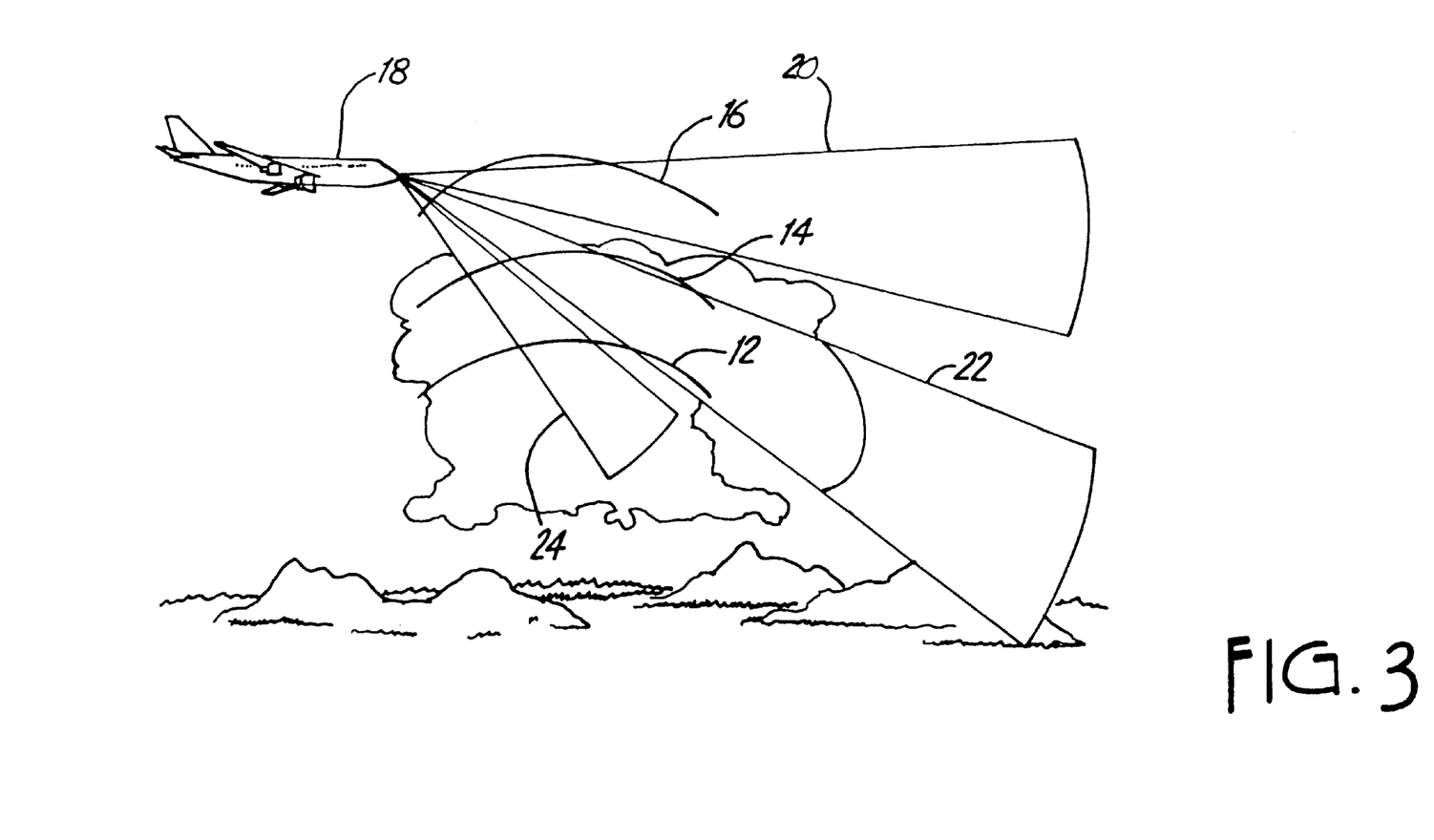
FIG. 3 is a diagram illustrating a multiple altitude radar system associated with an aircraft according to a second exemplary embodiment of the present invention.

FIG. 3 is a diagram illustrating a multiple altitude radar system associated with aircraft 18 according to a second exemplary embodiment of the present invention. The radar system shown in FIG. 3 performs main radar sweep 20 in front of aircraft at the same general altitude of aircraft 18, performs first secondary radar sweep 22 at a first angle from aircraft 18 toward the ground, and performs second secondary radar sweep 24 at a second angle, steeper than the first angle, from aircraft 18 toward the ground. Main radar sweep 20 detects any weather patterns existing at the altitude of aircraft 18 in its general flight path direction. First secondary radar sweep 22 detects weather patterns existing at an altitude below the altitude of aircraft 18 in its general flight path direction. Second secondary radar sweep 24 detects weather patterns located generally below and slightly in front of aircraft 18, at relatively short range. The combination of radar sweeps 20, 22 and 24 provide a complete analysis of long and short range weather patterns, and the data provided by all three beams may be synthesized to obtain specific information and characteristics of the detected weather patterns.

Figure 4:
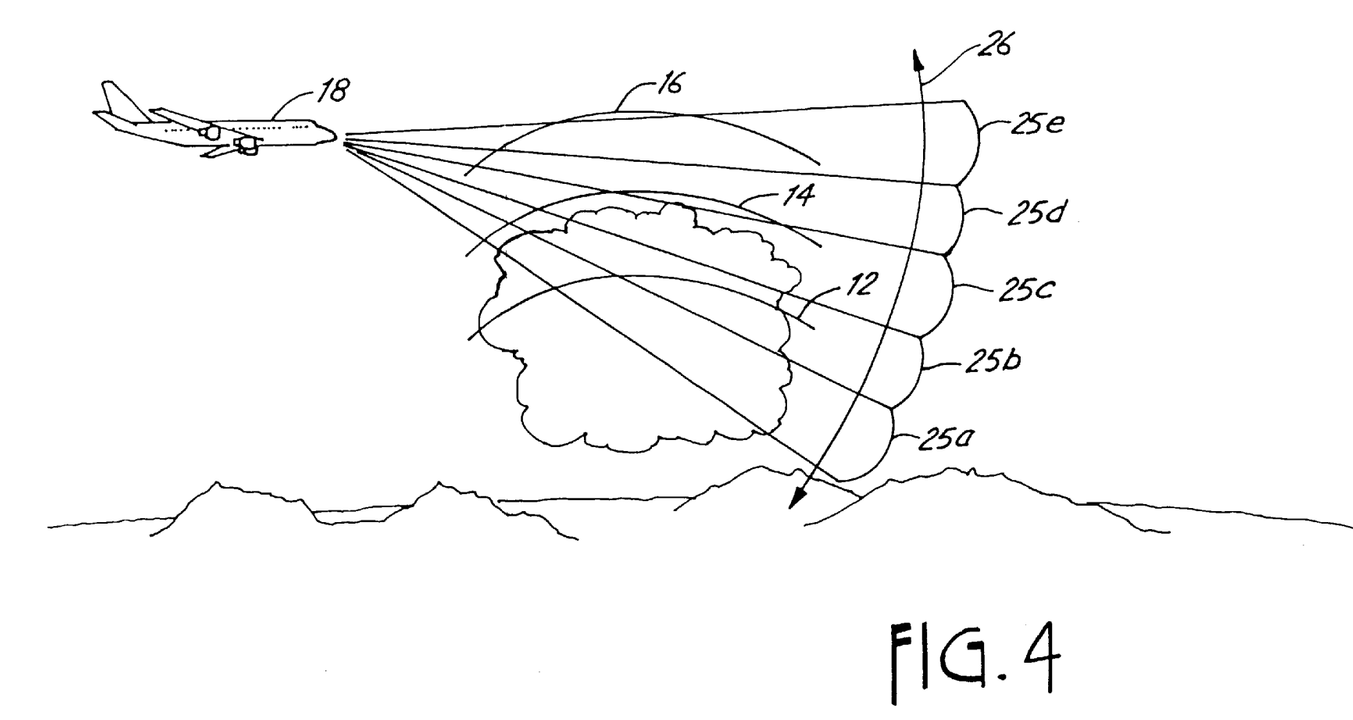
FIG. 4 is a diagram illustrating a multiple altitude radar system associated with an aircraft according to a third exemplary embodiment of the present invention.

FIG. 4 is a diagram illustrating a multiple altitude radar system associated with aircraft 18 according to a third exemplary embodiment of the present invention. The embodiment shown in FIG. 4 performs a vertical radar sweep, indicated by successive radar beams 25a, 25b, 25c, 25d and 25e swept in the general direction of arrows 26. In one particular embodiment, the vertical radar sweep is performed only when a weather pattern has been detected by one of the horizontal radar sweeps performed by the radar system, in order to provide information about the vertical size of the weather pattern and potentially to determine a rate of vertical growth of the weather pattern. By only performing a vertical radar sweep in response to detection of a weather pattern, the time required to divert the radar antenna to a vertical sweep is reduced in comparison to a full or more complete three-dimensional radar pattern. Such radar patterns could be performed according to an alternate embodiment, particularly if radar scanning speeds were to increase or if the radar system were to be electronically controlled.

The invention is also useful in modeling cell growth rates and in predicting potential weather hazards based on the growth rates of cells in the anticipated flight path of an aircraft. For example, a weather hazard that is repeatedly detected by a radar beam that is transmitted at the same angle may be predicted to intersect the flight path of the aircraft at a given time. Another method of predicting potentially hazardous weather events is accomplished by detecting the event at different angles. Specifically, a weather event detected by a first radar sweep at a first known angular position will be detected at a first gain level. The same weather event detected by a second radar sweep at a second known angular position will be detected at a second gain level. Since the detected gain is a characteristic of the known radiation pattern of the antenna, the angular position of the weather event relative to the aircraft can be derived using the difference between the first and second detected gain levels. Repeating this "dual beam" scanning technique at a later time during will detect any change in the relative angular position of the weather event with respect to time. Vertical speed (or growth rate) of the weather event can then be estimated using a suitable algorithm. Finally, the estimated vertical growth rate may be used, along with the distance between the aircraft and the weather event, to predict a potential weather hazard in the aircraft's anticipated flight path. Such a "dual beam" scanning technique may be replaced by suitable monopulse scanning techniques to similarly model developing weather events.

Figure 5:
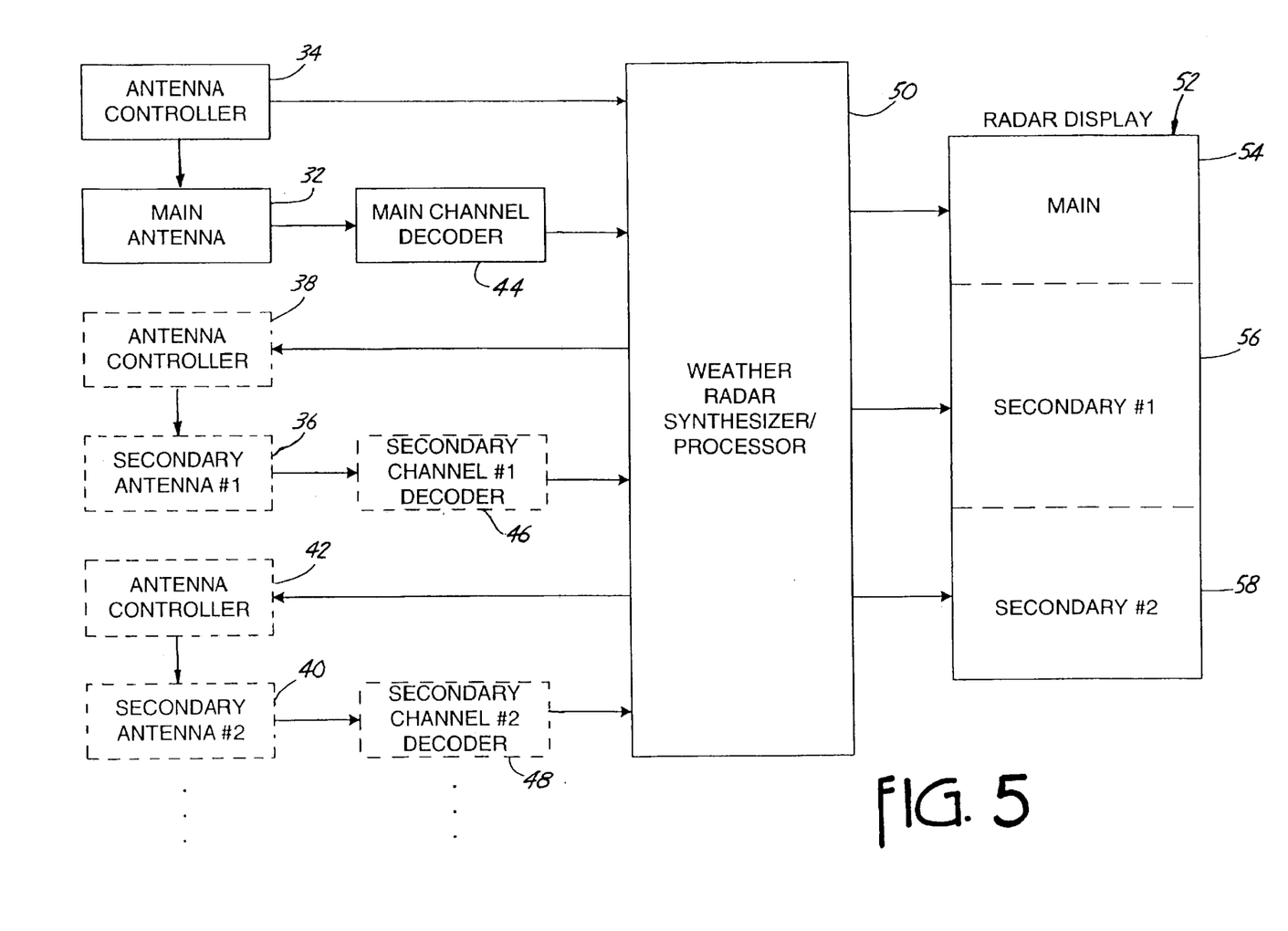
FIG. 5 is a functional block diagram of an exemplary multiple altitude radar control system according to the present invention.

FIG. 5 is a functional block diagram of an exemplary multiple altitude radar control system according to the present invention. The multiple altitude radar system includes main radar antenna 32 operating under the control of antenna controller 34. In some embodiments of the invention, additional antennas such as first secondary antenna 36 (operating under the control of antenna controller 38) and second secondary antenna 40 (operating under the control of antenna controller 42) may also be employed in the radar system to perform the multiple altitude radar sweeps described above with respect to FIGS. 2–4.

Signals obtained by main antenna 32 are converted into an appropriate data format by main channel decoder 44. In the embodiments of the invention employing additional radar antennas, the signals obtained by first secondary antenna 36 are converted into an appropriate data format by first secondary channel decoder 46 and the signals obtained by second secondary antenna 40 are converted into an appropriate data format by second secondary channel decoder 48.

The data from each radar channel is processed by weather radar synthesizer/processor 50 to formulate weather models from the radar data. Weather radar synthesizer/processor 50 provides appropriate control signals to antenna controller 34 (and to antenna controllers 38 and 42 in some embodiments) to direct main antenna 32 (and secondary antennas 36 and 40 in some embodiments) in a manner that yields the desired weather detection performance. Weather radar synthesizer/processor 50 outputs data representative of the formulated weather models to radar display 52. This data includes not only two-dimensional weather location information, but also has weather altitude information, and in an optional embodiment may include derived information about the turbulence associated with weather patterns, the rate of growth of storm cells, or other types of weather information. In an exemplary embodiment, weather radar synthesize/processor 50 is equipped with a digital signal processor (DSP) to provide the ability to perform a large number of calculations at high speed for deriving weather information from the radar data.

Figure 6A:
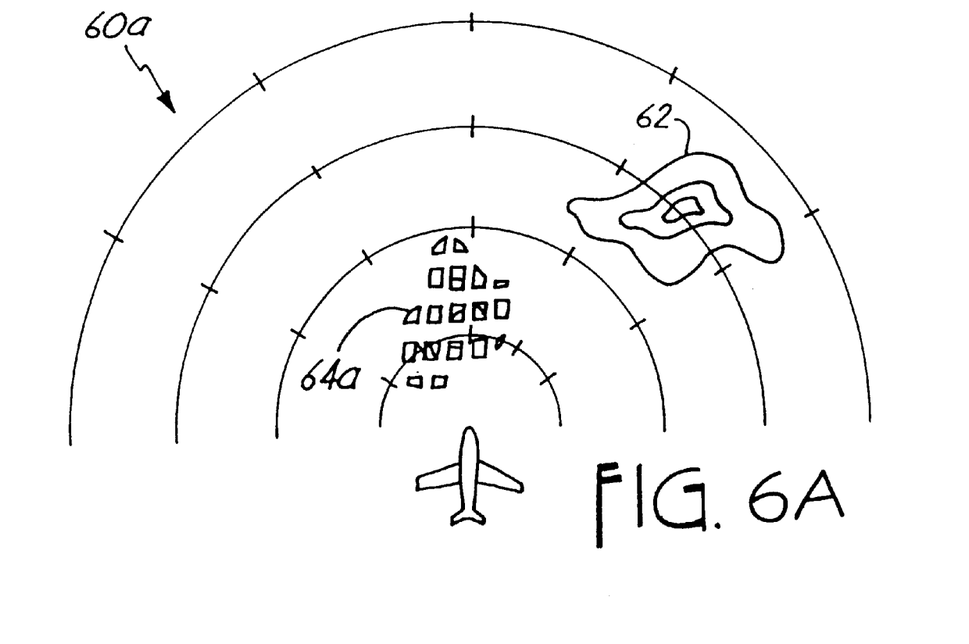
FIGS. 6A and 6B are diagrams of exemplary radar displays according to the present invention.
Figure 6B:
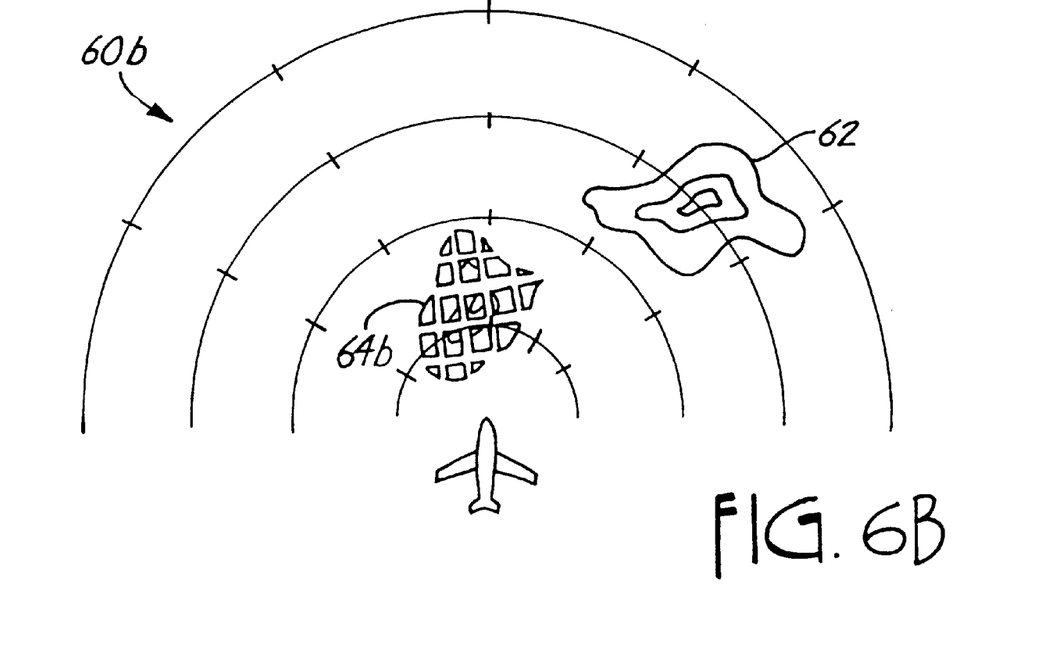
Figure 7:
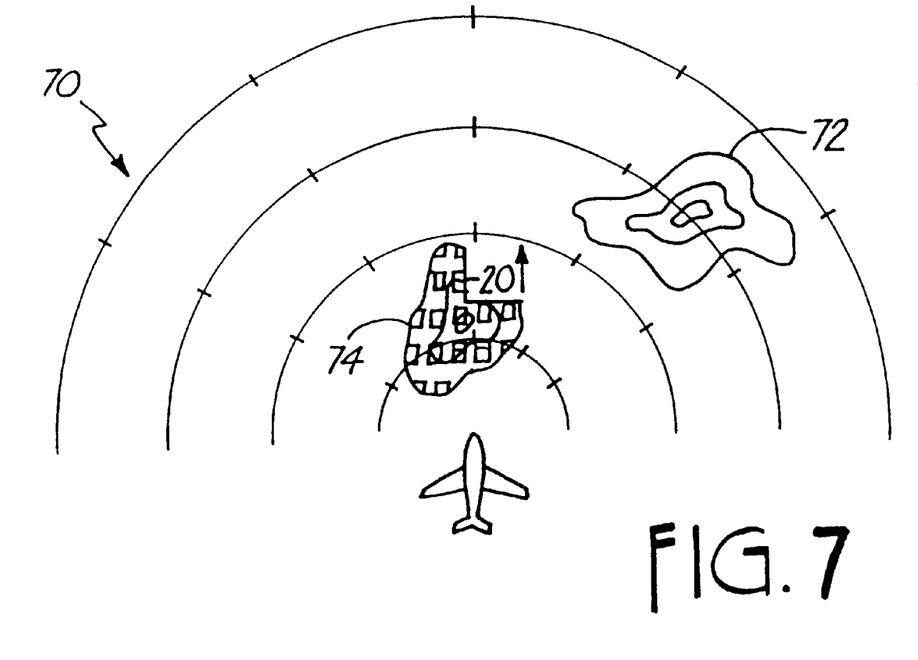
FIG. 7 is a diagram of another exemplary weather display according to the present invention.

The format of radar display 52 may take a number of forms. A single display may simply provide weather information with the standard encoded colors to indicate weather severity. Alternatively, a single display may provide all of the weather information (including location and altitude information), by including icons or other representative symbols on the display to indicate altitude and other weather characteristics. Altitude and other weather characteristics could also be represented by modulating the density of the displayed weather pattern. In another optional embodiment, radar display 52 may include main display 54, secondary display 56 and secondary display 58 to independently display weather locations at multiple altitudes. Alternatively, main display 54 may display weather locations and altitudes (by including icons or other representative symbols), while secondary displays 56 and 58 may display weather information such as turbulence, storm growth rates, and predictions of encounters with growing cells. Several examples of weather displays in accordance with the present invention are shown in FIGS. 6–7, which are discussed in more detail below. Other arrangements of radar display 52 will be apparent to those skilled in the art, as the multiple altitude radar system of the present invention provides a greater amount of radar data that enables more complex and complete weather information to be ascertained and displayed.

FIGS. 6A and 6B are diagrams of exemplary radar displays 60a and 60b according to the present invention. Radar displays 60a and 60b employ display density modulation to indicate the relative altitude of detected weather patterns. For example, the weather configuration shown in FIG. 6A includes weather pattern 62 existing at the same general altitude as the aircraft, and weather pattern 64a located at an altitude well below the altitude of the aircraft. In order to indicate the large clearance between the aircraft and weather pattern 64a, radar display 60a represents weather pattern 64a with a low density. Similarly, the weather configuration shown in FIG. 6B includes weather pattern 62 existing at the same general altitude as the aircraft, and weather pattern 64b located at an altitude that is only slightly below the altitude of the aircraft. In order to indicate the small clearance between the aircraft and weather pattern 64b, radar display 60b represents weather pattern 64b with an intermediate density, less than the density of weather pattern 62 and greater than the density of weather pattern 64a (FIG. 6A). This type of density modulation gives the pilot of the aircraft a qualitative indication of the relative altitude of weather patterns shown on the display. Density modulation could also be used to indicate either a possible encounter or a possible safe overflight based on predictions of cell growth and decay.

FIG. 7 is a diagram of exemplary weather display 70 according to the present invention. Radar display 70 employs a numeric labeling scheme and arrow indicator to provide information relating to the altitude and growth rate of weather patterns. For example, the weather configuration shown in FIG. 7 includes weather pattern 72 existing at the same general altitude as the aircraft, and weather pattern 74 located at an altitude 2000 feet below the altitude of the aircraft and growing at a relatively high rate. Weather pattern 72 is displayed according to normal weather color coding techniques to indicate severity. Weather pattern 74 is also displayed in that same general manner, with a numeric label (−20) indicating that the weather pattern is located 2000 feet below the altitude of the aircraft, and an up-arrow indicating that the weather pattern is growing upward. In one exemplary embodiment, the size of the arrow indicator may be related to the rate of growth of the weather pattern. Alternatively, an icon may be used instead of numeric and arrow labels to represent similar information, with certain colors or shapes of icons representing the clearance and/or growth rate of detected weather patterns.

The multiple altitude radar system of the present invention provides the ability to detect and manipulate weather locations and characteristics that were not ascertainable with prior radar systems. A main radar sweep is performed to detect weather patterns at the same general altitude as the aircraft, and at least one secondary radar sweep is performed to detect weather patterns at an altitude below the general altitude of the aircraft. The information obtained by the multiple radar sweeps can then be analyzed and manipulated to provide weather locations in three dimensions as well as more complex and complete weather information such as turbulence, storm growth rates, and the like.

Although the present invention has been described with reference to preferred embodiments, workers skilled in the art will recognize that changes may be made in form and detail without departing from the spirit and scope of the invention.

What is claimed is:

1. A method of detecting and displaying weather patterns at multiple altitudes from an aircraft, the method comprising:

performing a main radar sweep at an altitude of the aircraft;

detecting a weather pattern at the altitude of the aircraft;

displaying the weather pattern at the altitude of the aircraft;

performing at least one secondary radar sweep at an angle from the altitude of the aircraft to a ground altitude;

detecting a weather pattern at an altitude below the altitude of the aircraft; and displaying the weather pattern at the altitude below the aircraft at a display density lower than a display density of the weather pattern at the altitude of the aircraft.

2. The method of claim 1, further comprising:

digitally truncating data provided by the at least one secondary radar sweep to eliminate ground clutter.

3. The method of claim 1, further comprising:

amplifying data provided by the main radar sweep with a first gain; and amplifying data provided by the at least one secondary radar sweep with a second gain controlled independently from the first gain.

4. The method of claim 1, wherein performing at least one secondary radar sweep comprises:
   performing a first secondary radar sweep at a first angle from the altitude of the aircraft to the ground altitude; and
   performing a second secondary radar sweep at a second angle from the altitude of the aircraft to the ground altitude, the second angle being steeper than the first angle.

5. The method of claim 1, further comprising:
   formulating weather models from data obtained by the main radar sweep and the at least one secondary radar sweep.

6. The method of claim 1, further comprising:
   displaying the weather pattern at the altitude below the aircraft at an intermediate display density when the altitude of the weather pattern below the aircraft is near the altitude of the aircraft.

7. The method of claim 5, further comprising:
   displaying weather information on multiple displays representative of the weather models formulated from the data obtained by the main radar sweep and the at least one secondary radar sweep.

8. The method of claim 7, wherein displaying weather information on multiple displays comprises:
   depicting one of different weather characteristics and weather locations at different altitudes on different ones of the multiple displays.

9. A method of detecting weather patterns at multiple altitudes from an aircraft, the method comprising:
   performing a main radar sweep at an altitude of the aircraft;
   performing at least one secondary radar sweep at an angle from the altitude of the aircraft to a ground altitude;
   repeatedly performing the main radar sweep and the at least one secondary radar sweep;
   detecting a weather pattern during a first performance of one of the primary radar sweep and the at least one secondary radar sweep;
   calculating a first angle measured from a flight path of the aircraft to the weather pattern;
   detecting the weather pattern during a second performance of one of the primary sweep and the at least one secondary radar sweep, wherein the first and second performance are separated by a predetermined time;
   calculating a second angle measured from the flight path to the weather pattern; and
   predicting a growth rate of a weather pattern into the flight path using the first and second angles and the predetermined time.

10. The method of claim 9, further comprising:
   detecting a weather pattern during a first performance of one of the primary radar sweep and the at least one secondary radar sweep;
   detecting said weather pattern during a second performance of said one of the primary radar sweep and the at least one secondary radar sweep,
   an encounter with the weather pattern being thereby predicted.

11. A multiple altitude radar system for an aircraft, comprising:
   at least one radar antenna for emitting at least one radar beam in a main radar sweep at an altitude of the aircraft and in at least one secondary sweep at an angle from the altitude of the aircraft to a ground altitude;
   a processor operatively coupled to the at least one radar antenna, the processor being operable to formulate weather information from data obtained by the at least one radar beam in the main radar sweep and in the at least one secondary radar sweep; and
   a display system operatively coupled to the processor for displaying the weather information wherein the display system is operable to display weather pattern growth rate information associated with weather information formulated by the processor.

12. The multiple altitude radar system of claim 11, wherein data obtained by the at least one radar beam in the at least one secondary radar sweep is digitally truncated to eliminate ground clutter.

13. The multiple altitude radar system of claim 11, wherein the at least one radar antenna comprises:
   a main radar antenna for emitting a main radar beam at the general altitude of the aircraft; and
   at least one secondary radar antenna for emitting at least one secondary radar beam at an angle from the altitude of the aircraft to the ground altitude.

14. The multiple altitude radar system of claim 13, wherein the at least one secondary radar antenna comprises:
   a first secondary radar antenna for emitting a first secondary radar beam at a first angle from the altitude of the aircraft to the ground altitude; and
   a second secondary radar antenna for emitting a second secondary radar beam at a second angle from the altitude of the aircraft to the ground altitude, the second angle being steeper than the first angle.

15. The multiple altitude radar system of claim 11, wherein the display system is operable to display altitude information associated with weather information formulated by the processor.

16. The multiple altitude radar system of claim 15, wherein the altitude information is represented by at least one of density modulation, numeric labeling, an icon, and color differentiation.

17. The multiple altitude radar system of claim 11, wherein the display system displays weather pattern growth rate information by an arrow indicating a direction of growth of the weather pattern near weather information obtained by the at least one secondary radar sweep.

18. The multiple altitude radar system of claim 17, wherein the display system displays the weather information obtained from the at least one secondary radar sweep with a numeric label to indicate an altitude of the weather pattern below the aircraft.

19. The multiple altitude radar system of claim 11, further including a display system operable to display a warning of an anticipated encounter with a weather pattern.

* * * * *